Nov. 12, 1968  W. C. MOOG, JR., ET AL  3,410,308
MOVING COIL ELECTROHYDRAULIC SERVOVALVE
Original Filed May 5, 1965  5 Sheets-Sheet 1

INVENTORS
William C. Moog, Jr.
Jerald D. Bidlack
BY Popp and Sommer
ATTORNEYS

Nov. 12, 1968  W. C. MOOG, JR., ET AL  3,410,308
MOVING COIL ELECTROHYDRAULIC SERVOVALVE
Original Filed May 5, 1965  5 Sheets-Sheet 2

INVENTORS
William C. Moog, Jr.
Jerald D. Bidlack
BY
Popp and Sommer
ATTORNEYS

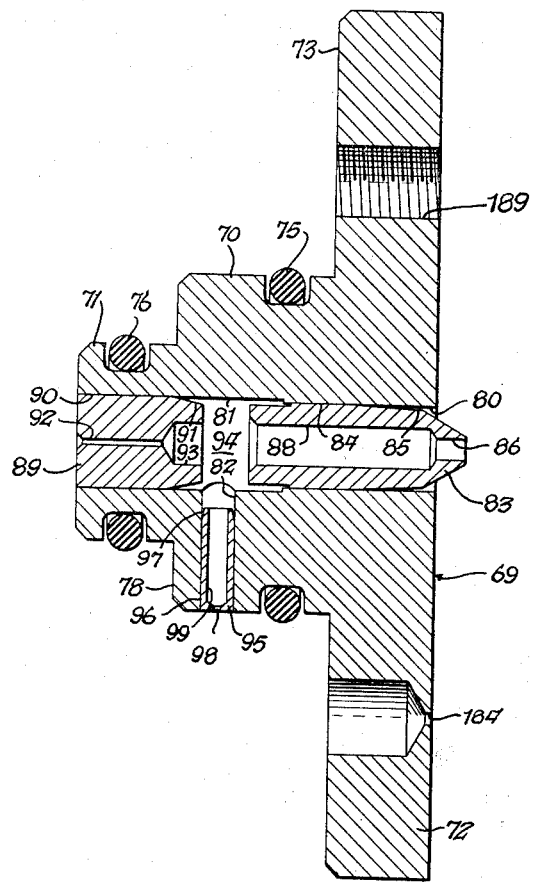

Nov. 12, 1968 W. C. MOOG, JR., ET AL 3,410,308
MOVING COIL ELECTROHYDRAULIC SERVOVALVE
Original Filed May 5, 1965 5 Sheets-Sheet 4
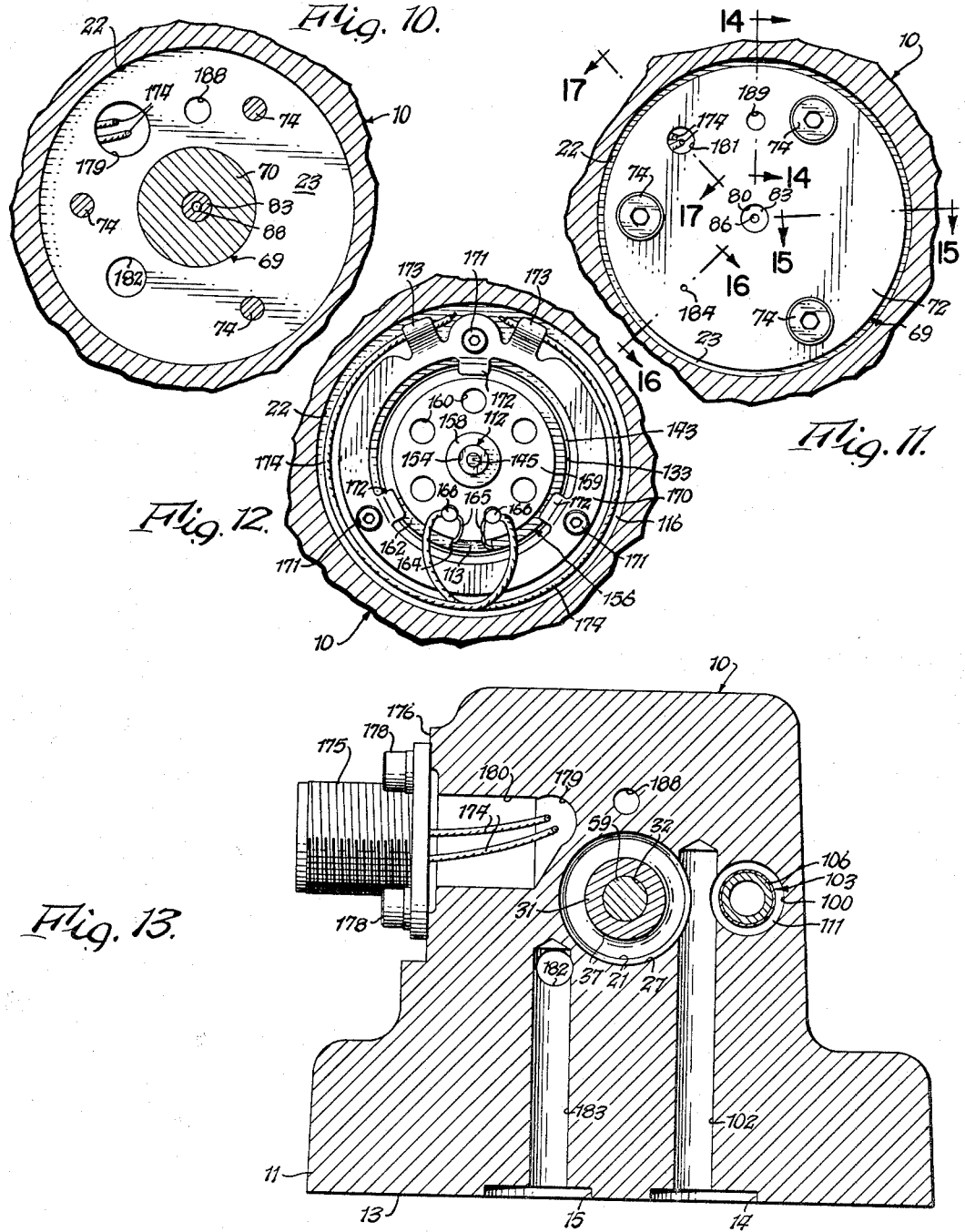
INVENTORS
William C. Moog, Jr.
Jerald D. Bidlack
BY Popp and Sommer
ATTORNEYS

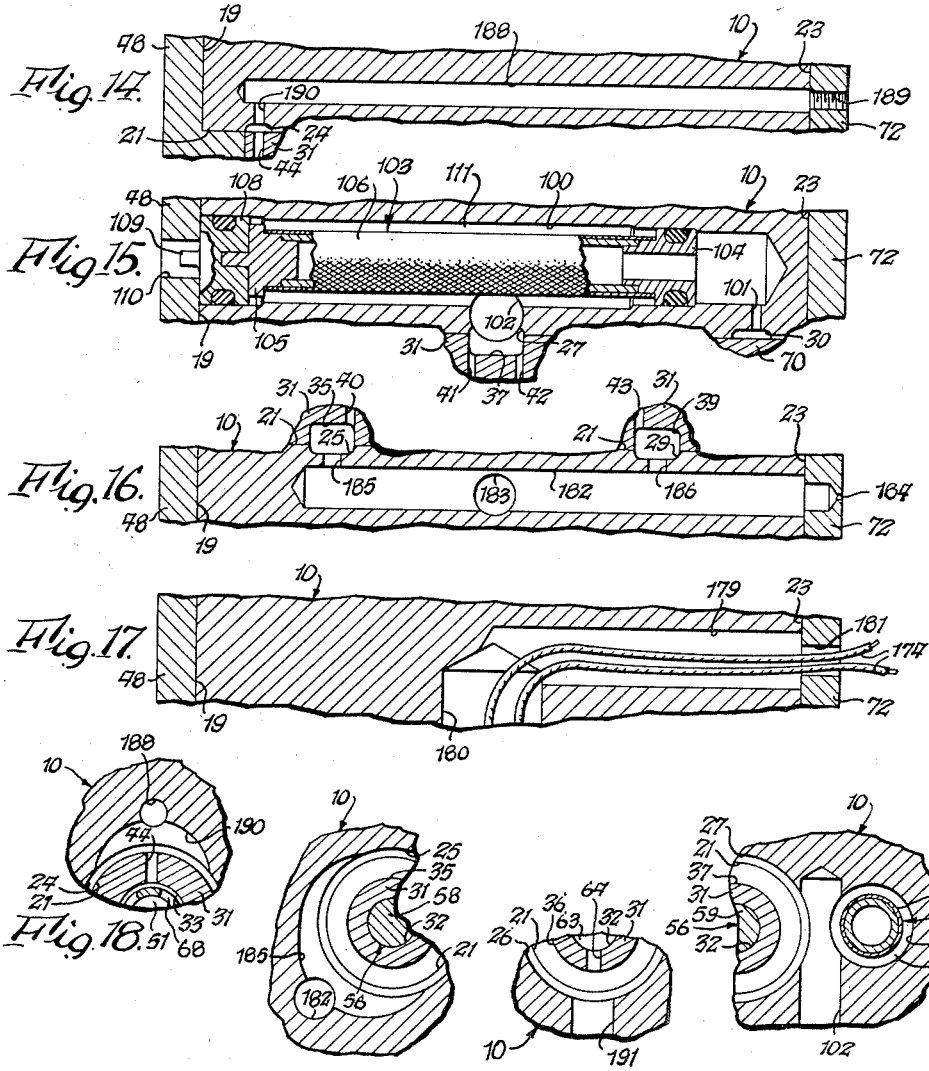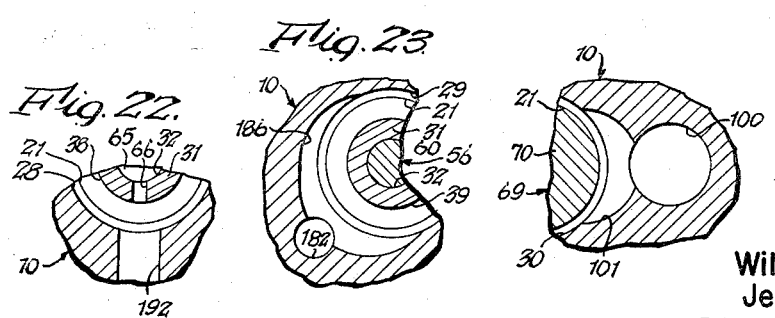

United States Patent Office 3,410,308
Patented Nov. 12, 1968

3,410,308
MOVING COIL ELECTROHYDRAULIC
SERVOVALVE
William C. Moog, Jr. and Jerald D. Bidlack, East
Aurora, N.Y., assignors to Moog Inc., a corporation of
New York
Continuation of application Ser. No. 453,391, May 5,
1965. This application Dec. 5, 1967, Ser. No. 688,265
17 Claims. (Cl. 137—625.61)

ABSTRACT OF THE DISCLOSURE

A servovalve is provided with an electromagnetic force motor including a signal input coil mounted on a movable reaction member impinged by fluid discharge by a nozzle, the spacing between the nozzle tip and the reaction member being responsive to an electrical command signal to the coil and thereby developing a pressure upstream of the nozzle which is applied to one end of a valve spool for controlling its position.

---

This application is a continuation of application Ser. No. 453,391 filed May 5, 1965 and now abandoned.

This invention relates to a moving coil electrohydraulic servovalve.

In an electrohydraulic servovalve employing a torque motor having a moving armature, such as illustrated in U.S. Patent No. 2,625,136, there is a flux change in the armature gap whenever the electrical current supplied to the coil of the motor is varied. This produces electrical hysteresis which can affect the position of the armature and hence the valve spool.

It is accordingly an important object of the present invention to provide an electrohydraulic servovalve in which the flux is constant and therefore electrical hysteresis is non-existent.

Another important object of the present invention is to provide such a servovalve the performance of which is insensitive to contamination of the fluid with which the servovalve is operated.

Another object is to provide such a servovalve which can be easily and readily disassembled and reassembled in the field by skilled technicians with a minimum of support equipment thereby to provide a servovalve with good field servicability.

Another object is to provdie such a servovalve which will have no null shift with a wide variation in supply pressure.

A further object is to provide such a servovalve which has relatively few parts of which many can be formed with simple manufacturing techniques thereby providing a servovalve which is relatively low in cost and simple in construction.

Other objects and advantages of the invention will appear from the following detailed description of a preferred embodiment illustrated in the accompanying drawings in which:

FIG. 8 is a substantially central sectional view through a nozzle block assembly embodying certain features of the present invention and enlarged as compared to the same assembly shown in FIG. 7.

FIG. 9 is a fragmentary vertical transverse sectional view of the motor means of the inventive servovalve taken on line 9—9 of FIG. 7.

FIG. 10 is a fragmentary vertical transverse sectional view of the inventive servovalve taken on line 10—10 of FIG. 7.

FIG. 11 is a fragmentary vertical transverse sectional view thereof taken on line 11—11 of FIG. 7.

FIG. 12 is a fragmentary vertical transverse sectional view taken on line 12—12 of FIG. 7.

FIG. 13 is a vertical transverse sectional view thereof taken on line 13—13 of FIG. 7.

FIG. 14 is a fragmentary vertical longitudinal sectional view thereof taken on line 14—14 of FIG. 11.

FIG. 15 is a fragmentary substantially horizontal longitudinal sectional view thereof taken on line 15—15 of FIG. 11.

FIG. 16 is a fragmentary longitudinal sectional view thereof taken on line 16—16 of FIG. 11.

FIG. 17 is a fragmentary longitudinal sectional view thereof taken on line 17—17 of FIG. 11.

FIG. 18 is a fragmentary vertical transverse sectional view thereof taken on line 18—18 of FIG. 7.

FIG. 19 is a fragmentary vertical transverse sectional view thereof taken on line 19—19 of FIG. 7.

FIG. 20 is a fragmentary vertical transverse sectional view thereof taken on line 20—20 of FIG. 7.

FIG. 21 is a sectional view similar to FIG. 13 but showing only a portion thereof.

FIG. 22 is a fragmentary vertical transverse sectional view thereof taken on line 22—22 of FIG. 7.

FIG. 23 is a fragmentary vertical transverse sectional view thereof taken on line 23—23 of FIG. 7.

FIG. 24 is a fragmentary vertical transverse sectional view thereof taken on line 24—24 of FIG. 7.

Figure 1:
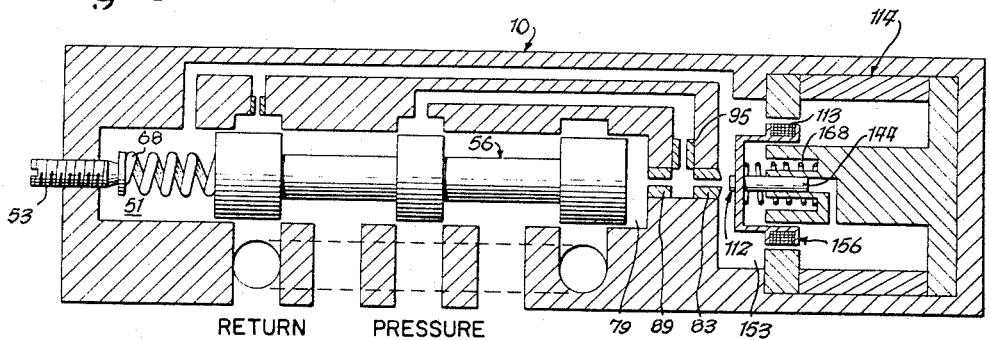
FIG. 1 is a diagrammatic sectional view of a moving coil electrohydraulic servovalve to illustrate certain features of the present invention.
Figure 2:
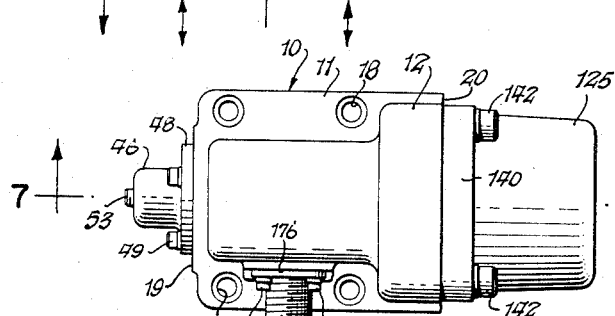
FIG. 2 is a top plan view of a commercial form of a moving coil electrohydraulic servovalve constructed in accordance with the principles of the present invention.
Figure 5:
FIG. 5 is a left end view thereof.
Figure 5:
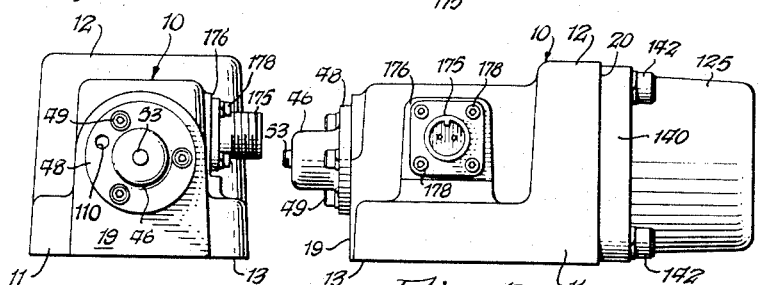
Figure 6:
FIG. 6 is a right end view thereof.
Figure 6:
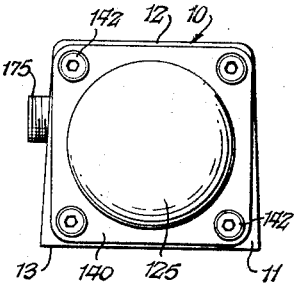
Figure 3:
FIG. 3 is a front side view thereof.
Figure 4:
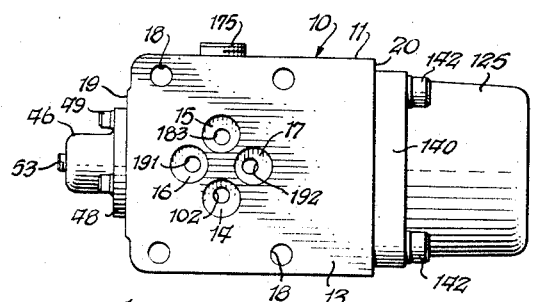
FIG. 4 is a bottom plan view thereof.
Figure 4:

Referring to FIGS. 2-7, the servovalve of the present invention is shown as comprising a body indicated generally at 10 including a base portion 11 and an enlarged head portion 12 at one end. The bottom surface 13 of base portion 11 is flat and provided with four ports 14, 15, 16 and 17, port 14 being a pressurized fluid supply port, port 15 being a fluid return port, and ports 16 and 17 being actuating ports which lead to and control the operation of an actuator (not shown) such as a piston movable in a cylinder. Base portion 11 is shown as having vertical holes 18, four being shown, through which suitable fastening devices such as screws (not shown) may extend for mounting the servovalve on some suitable support (not shown) which has passages communicating severally with ports 14–17.

The left end of body 10 is shown as being provided with a flat surface 19. The right end surface 20 of the head portion 12 of the body is also flat.

Internally, the body 10 is shown as provided with a horizontal through bore 21 of cylindrical configuration which is enlarged at one end to provide a counterbore 22 thus leaving a vertical flat annular shoulder surface 23 between the bore and counterbore. The wall of bore 21 is shown as provided at spaced intervals along its length with a plurality of annular grooves, these being identified in reading from left to right as viewed in FIG. 7 by the numerals 24, 25, 26, 27, 28, 29 and 30.

Arranged in body bore 21 is a valve bushing 31 having a cylindrical through-bore 32 enlarged at its left end to provide a counterbore 33 and at its opposite end also being enlarged to provide a counterbore 34. Bushing 31 is shown as provided with a series of external annular grooves 35, 36, 37, 38 and 39 which register with body grooves 25–29, respectively. Several radial metering ports 40 extend between the right end of bushing groove 35 and bore 32. Similar radial metering ports 41 are arranged at the left end of bushing groove 37 and similar metering ports 42 are arranged at the opposite end of this groove, all these ports connecting with bushing bore 32. Similar metering ports 43 are arranged at the left end of groove 39 to connect the same with bushing bore 32. This bushing is also shown as having a radial hole 44 extending between its periphery and left counterbore 33 so as to place this counterbore in communication with body groove 24. Bushing 31 is further shown as having a series of external annular grooves arranged on opposite sides of each of the grooves 35–39 and an O-ring typically represented by the numeral 45 is arranged in each such groove, such O-ring engaging the opposing wall of body bore 21.

Figure 7:
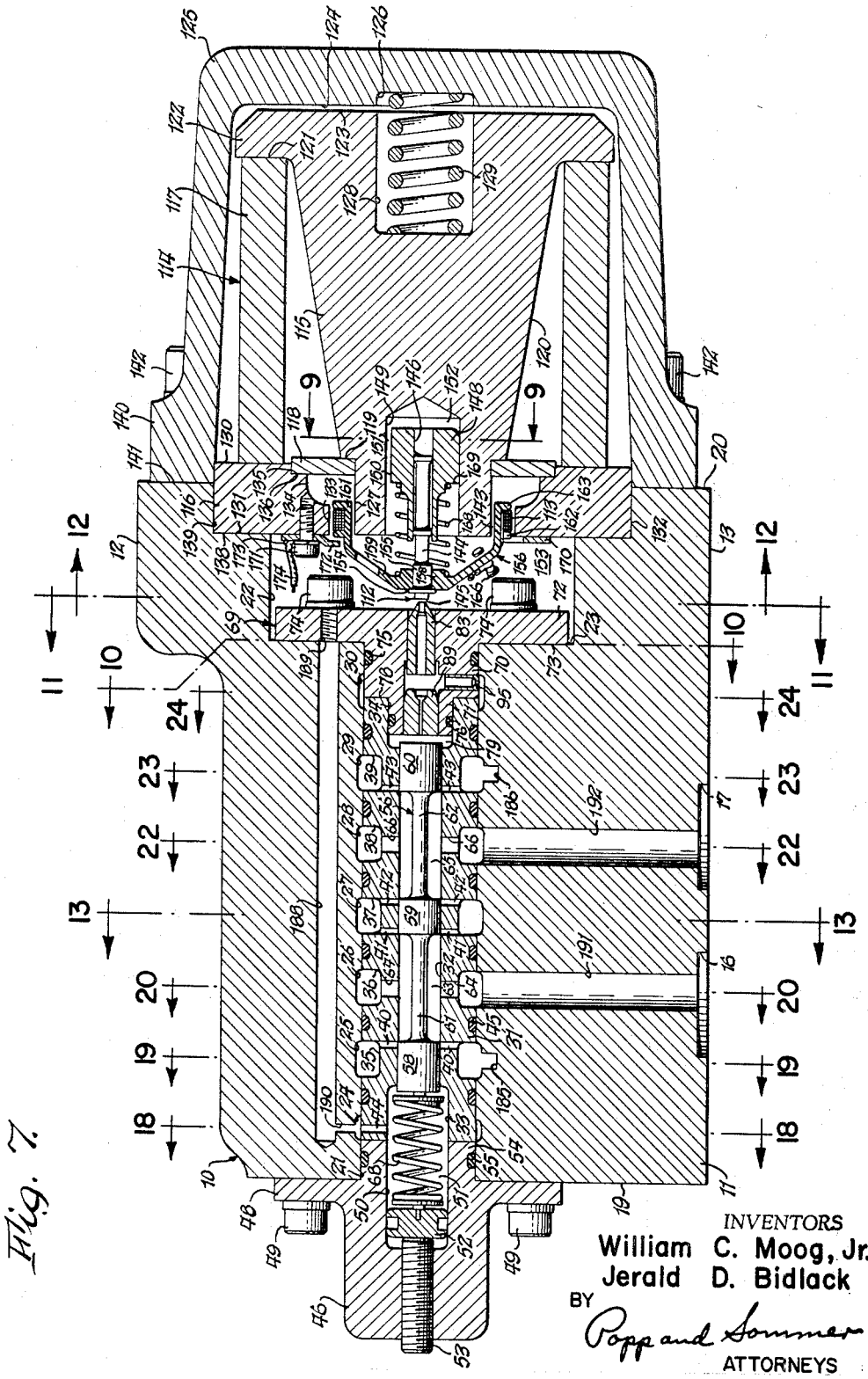
FIG. 7 is an enlarged vertical central longitudinal sectional view thereof taken on line 7—7 of FIG. 2.

At the left end as viewed in FIG. 7, bushing 31 is engaged by an end cap 46. This end cap is shown as having an annular attaching flange 48 through which cap screws 49, three being shown, extend and screw into threaded recesses in body 10 whereby the end cap is removably secured to this body. This end cap is also shown as provided with a cylindrical recess 50 which forms an extension of bushing counterbore 33 whereby a left spool end chamber 51 is provided. Slidably arranged in this chamber 51 is an adjustor 52 the axial position of which can be determined by a screw 53 extending through a central horizontal internally threaded hole provided in the outer portion of end cap 46. The inner end of cap 46 is shown as having a cylindrical plug portion 54 which closes the left end of body bore 21. This plug portion has an external annular groove in which an O-ring 55 is arranged which engages the wall of body bore 21.

Slidably arranged in bushing bore 32 is a valve spool indicated generally at 56. This valve spool 56 is shown as having a left cylindrical end lobe 58, a central cylindrical lobe 59 and a right cylindrical lobe 60. Lobes 58 and 59 are connected by a stem 61 of comparatively reduced diameter. Similarly lobes 59 and 60 are connected by a stem 62 of comparatively smaller diameter. Thus an annular space 63 surrounds stem 61 and is placed in communication with groove 36 by a series of radial holes 64 in bushing 31. Likewise, an annular space 65 surrounds stem 62 and communicates with groove 38 by a series of radial holes 66 provided in bushing 31.

The opposing end faces of the three lobes 58–60 have square outer annular corners and flat sides. The end faces of lobes 58 and 59 have the same axial spacing as the opposing flat edges of metering ports 40 and 41. Similarly, the opposing end faces of 59 and 60 are flat and have square outer annular corners and are axially spaced apart a distance corresponding to the axial distance between the opposing flat edges of metering ports 42 and 43.

Operatively arranged in left spool end chamber 51 and between adjustor 52 and left spool end lobe 58 is a helical compression spring 68. This spring is arranged to bias or urge valve spool 56 to the right as viewed in FIG. 7 for a purpose which will be explained later herein.

A nozzle block assembly indicated generally by the numeral 69 is arranged at the right end of valve spool 56. This assembly includes a cylindrical nozzle block 70 having a reduced cylindrical end portion 71 at its left end and an enlarged annular flange portion 72 at its right end, this flange portion having an inner flat surface 73 arranged to engage body shoulder 23. As best shown in FIG. 11, a series of cap screws 74, three being shown, are arranged at equidistant circumferential intervals and extend through holes in flange portion 72 and are screwed into internally threaded recesses provided in body 10.

The central cylindrical portion 70 of the nozzle block closes the right hand end portion of body bore 21. The periphery of this portion 70 is shown as provided with an annular groove in which an O-ring 75 is arranged, this O-ring engaging the wall of body bore 21 to the right of body groove 30.

Cylindrical end portion 71 of the nozzle block closes bushing counterbore 34. The periphery of this portion 71 is shown as provided with an external annular groove in which an O-ring 76 is arranged, this O-ring engaging the opposing wall surface of bushing counterbore 34. The shoulder 78 formed between cylindrical portions 70 and 71 of the nozzle block is radial and annular and abuts the right hand radial end face of bushing 31.

In this manner bushing 31 is confined in body 10 between adjustor end cap 46 and nozzle block shoulder 78.

Right bushing counterbore 34, the outer end face of right spool end lobe 60 and the opposing end face of block portion 71 of the nozzle block jointly form a right spool end chamber 79.

Nozzle block 69 is shown as having a horizontal throughbore 80 about half of which at that portion adjacent valve spool 56 is slightly enlarged as indicated at 81. The nozzle block also has a radial bore 82 extending laterally from counterbore 81 adjacent the inner end thereof, this counterbore terminating at its outer end in the peripheral surface of the nozzle block opposite body groove 30.

A nozzle member 83 is shown as secured in throughbore 80 so that the tip of this nozzle extends slightly outwardly or to the right of the outer end face of the nozzle block as shown in FIGS. 7 and 8. This nozzle member 83 is tubular, having a cylindrical periphery 84 intermediate its ends which has an interference fit with the wall surface of bore 80. Forwardly or to the right of this cylindrical portion 84 is a tapered section 85 which contracts toward the nozzle tip or to the right as viewed in FIGS. 7 and 8. Interiorly nozzle member 83 has a through bore-including an aperture 86 at its outer end or tip and an enlarged counterbore 88 extending for the balance of its length. Nozzle member 83 is mounted on the nozzle block by inserting it through the enlarged counterbore 81 of the block and pushing it forwardly or to the right so that tapered portion gradually cams the nozzle member into an interference fit between its cylindrical peripheral portion 84 and the wall surface of the reduced block bore portion 80.

In rear or to the left of nozzle member 83 is a damping orifice member 89. This member has a cylindrical periphery 90 and a tapered portion 91 at its inner end. Interiorly member 89 has a through-bore including an outer restricted orifice portion 92 which is enlarged at its inner end as indicated at 93. Tapered portion 91 permits damping orifice member 89 to be inserted into the enlarged portion 81 of the nozzle block so that the cylindrical portion 90 of this member can be press-fitted into an interference fit with the wall portion of counterbore 81. As shown in FIGS. 7 and 8 damping orifice member 89 is inserted until its outer end is substantially flush with the end face of plug portion 71 of the nozzle plug, in which position the inner end of this member will be spaced from the opposing inner end of nozzle member 83 to provide a chamber 94 therebetween.

As shown in FIG. 7, lateral bore 82 in the nozzle plug communicates with body groove 30. Secured within this bore 82 is a restricted inlet orifice member 95 which has a cylindrical peripheral surface 96 for most of its length. Tapered inner end portion 97 permits member 95 to be inserted into lateral bore 82 so that the peripheral surface 96 of this member will have an interference fit with the wall surface of bore 82. Inlet orifice member 95 is tubular having a through-bore including a restricted orifice portion 98 adjacent its outer end and an enlarged inner bore portion 99 for the balance of its length. Member 95 is inserted in the nozzle plug so that its outer end face is substantially flush with the peripheral surface of nozzle plug 70, as shown in FIGS. 7 and 8.

Means are provided for supplying pressurized fluid to body groove 30 and hence, through inlet orifice member 95, chamber 94 and damping orifice member 89, fluid is supplied to spool end chamber 79. Such means are best shown in FIGS. 13, 15 and 21. Body 10 is provided with a horizontal recess 100 which leads from the left end face 19 to a point adjacent body groove 30 and extends generally longitudinally of this body having an axis generally parallel to that of body bore 21. As shown in FIG. 15, the inner end of recess 100 is connected to body groove 30 via a radial passage 101 provided in the body. As shown in FIGS. 13 and 21, body bore 100 and body groove 27 are intercepted by the upper end portion of a vertical inlet passage 102 which at its lower end communicates with port 14.

Arranged in body bore 100 is a filter assembly indicated generally at 103. While this filter assembly may have any suitable construction, the same is shown as including an inner tubular support 104 sealingly supported on the wall portion of body bore 100, an opposite end support 105 and a foraminous element 106 extending between members 104 and 105 and suitably mounted thereon. A retainer 108 supports the end of filter assembly 103 adjacent member 105 and is sealingly engaged with a wall portion of body bore 100 adjacent body end face 19. Retainer 108 is shown in FIG. 15 as having a central outwardly projecting axial pin 109 which projects into a hole 110 provided in flange portion 48 of adjustor end cap 46.

It will be seen that the annular space 111 surrounding filter element 106 communicates directly with inlet passage 102. In passing through this filter element, the fluid such as hydraulic oil is filtered and the filtered fluid flows outwardly through the inner tubular end support 104 into the inner end portion of body bore 100 so as to supply radial passage 101 leading to body groove 30.

Pressurized fluid so supplied to body groove 30 flows through restricted inlet orifice 98, into the nozzle block internal chamber 94, from whence it can flow through damping orifice 92 into right spool end chamber 79 or through nozzle aperture 86 to be discharged into the space surrounded by body counterbore 22.

Means are provided for controlling the flow of fluid discharged by nozzle member 83 whereby the pressure in spool end chamber 79 can be regulated and hence the axial position of valve spool 56 relative to bushing 31. Such means are shown in FIGS. 7 and 10 and 12 and 13 includes a movable reaction member indicated generally at 112 which carries a movable coil 113 of an electromagnetic force motor means indicated generally at 114. Such motor means will now be described.

The motor means 114 is shown as including an inner pole piece 115 of magnetic material, an outer pole piece 116 of magnetic material, a permanent magnet ring 117 and a positioning ring 118 of non-magnetic material.

Inner pole piece 115 is a post-like member having a small end and a large end. The small end is provided by an external cylindrical surface portion 127 arranged coaxially with nozzle member 83. Pole piece 115 is stepped adjacent the inner end of its cylindrical portion 127 to provide an axially facing annular flat radial shoulder 119. The outer annular edge of this shoulder defines the small end of an intermediate frusto-conical surface portion 120 which at its large end merges with an annular flat radial shoulder 121 formed by a flange portion 122 on the inner pole piece 115. The large end of this inner pole piece has a flat end face 123 which opposes in slightly spaced relation the flat bottom surface 124 of a cup-shaped motor cover 125. Centrally, the base of the cover is shown as provided with a shallow recess 126 and the large end of the inner pole piece 115 is shown as provided with a comparatively deeper recess 128. A helical compression spring 129 is shown as arranged in the combined recesses 126 and 128, its one end bearing against inner pole piece 115 and its other end against the end wall of cover 125.

Permanent magnet ring 117 at one end engages flange shoulder 121 of inner pole piece and at its opposite end engages opposing flat end face 130 of outer pole piece 116. This outer pole piece is a ring member having an opposite axially facing flat radial surface 131, a cylindrical outer periphery 132 and three stepped inner cylindrical peripheral surfaces 133, 134 and 135. End face 131 lies in substantially the radial plane of the small end face of inner pole piece 115. The opposite end face 130 of outer pole piece 116 is substantially in alinement with annular shoulder 119 on inner pole piece 115. The offset between inner peripheral surfaces 134 and 135 of outer pole piece 116 provides an axially facing annular radial shoulder 136 which faces in an axial direction opposite from that faced by shoulder surface 119 on inner pole piece 115.

Positioning ring 118 is a washer-like member having cylindrical inner and outer peripheries and flat end faces. The inner cylindrical periphery of ring 118 engages surface 127 of inner pole piece 115. The outer peripheral surface of ring 118 engages inner peripheral surface 135 on outer pole piece 116. As well the opposite end faces of ring 118 engage the respective annular shoulders 119 and 136 on the inner and outer pole pieces 115 and 116, respectively.

Outer pole piece end face 131 engages an annular radial shoulder 13 formed by a further counterbore 139 adjacent body end face 20.

The rim of the cup-shaped cover 125 is provided with a rectangularly outlined attaching flange 140 having a flat end face 141 which abuts body end face 20. At suitable intervals such as at the four corners of the attaching flange 140 the same is provided with holes to receive severally cap screws 142 which extend through these holes and have their shanks screwed into threaded recesses provided in body 10.

With the cover 125 so removably secured to body 10, it will be seen that spring 129 presses inner pole piece 115 against permanent magnet ring 117 which in turn presses outer pole piece 116 against body shoulder 138. The positioning ring 118 maintains an annular clearance between the opposing and radially spaced peripheral surfaces 127 and 133 of the inner and outer pole pieces 115 and 116, respectively. This annular space or clearance provides a magnetic gap indicated at 143. It is across this gap that the flux extends between the inner and outer pole pieces. It is also in this gap that the coil 113 is movably arranged. The construction of this coil and its support on the reaction member 112 will now be described.

Reaction member 112 comprises a pin 144 having a flat end face 145 which opposes the tip of nozzle member 83. This pin 144 is arranged coaxially with nozzle member 83 and is movable relative thereto so that the spacing between the nozzle tip and pin end face 145 provides an annular orifice of variable circumferential area for the fluid which is discharged by the nozzle aperture 86. Fluid so discharged impinges pin end face 145 and flows laterally through the area of this annular orifice the size of which depends upon the axial position of the pin end face relative to the nozzle tip.

Pin 144 is shown as being slidably arranged in a guideway 146 provided in an insert member 148 which is press-fitted into a cylindrical recess 149 formed in inner pole piece 115. As shown in FIG. 9, the cylindrical periphery of insert member 148 is provided with a chordal flat surface 150 by which a clearance 151 is established between this flat and the opposing wall surface of recess 149. This clearance 151 provides a passage connecting the space 152 at the inner end of recess 149 and communicating with the inner end portion of guideway 146 with a chamber 153 surrounded by body counter bore 22 and into which nozzle member 83 discharges fluid.

Pin 144 is also shown formed with an enlarged annular collar 154 adjacent end face 145. Slidably mounted on the cylindrical portion 155 adjacent collar 154 is a bobbin member 156. This bobbin member 156 includes a hub portion 158 surrounding cylindrical pin portion 155 and on one side engaging the shoulder formed by collar 154 on pin 144. Integrally formed with hub portion 158 is a frusto-conical section 159 which is provided with a series of circumferentially spaced holes 160 as best shown in FIG. 12. The large end of the frusto-conical section 159 is shown as integrally formed with a cylindrical portion 161 having a pair of axially spaced annular external ribs 162 and 163. It is in the annular grove formed by cylindrical portion 161 and ribs 162 and 163 that the coil 113 is disposed. Rib 162 is shown in FIG. 12 as having a cutout portion indicated at 164 through which the ends 165 of the coil 113 extend. These coil ends 165 are suitably connected to terminal posts 166 suitably mounted on the frusto-conical portion 159 of the bobbin member at a location adjacent cutout 164.

The bobbin member 156 is urged against collar member 154 by a helical compression spring 168. This spring at one end engages the bobbin member adjacent its hub portion 158 and at its opposite end engages a shoulder 169 formed on insert member 148.

One of the features of the invention is that by removing cover 125, the reaction member 112 and motor means 114 will remain as an assembly with the cover. In view of the urging of reaction member spring 168, it is deemed desirable to provide means for limiting the movement of the bobbin member 156 as urged by this spring. Such retainer means are illustrated in FIGS. 7 and 12 and will now be described. The retainer means comprises a flat sheet metal ring member 170 which is held by screws 171, three such screws being shown, against end face 131 of outer pole piece 116. The inside diameter of this ring member 170 is slightly larger than the diameter of inner cylindrical surface 133 of outer pole piece 116. Extending radially inwardly and slightly offset axially from ring member 170 are fingers 172, three such fingers being shown with each being arranged opposite one of the attaching screws 171. The offset of these inner fingers 172 is axially away from end face 131 of outer pole piece 116. The inner or free end portions of these fingers 172 overlap bobbin rib 162 so that if spring 168 urges the bobbin member outwardly of air gap 143, this bobbin rib 162 will strike fingers 172 and will be retained thereby.

Ring member 70 is also shown as formed with a pair of radially outwardly extending clamp fingers 173. These fingers 173 are shown as being arranged generally diametrically opposite from the places where the terminals 166 are mounted on bobbin member 156. The purpose of clamp fingers 173 is to hold lead wires 174 which at one end are severally connected to terminals 166. After being held against the end face 131 of outer pole piece 116 by the clamp fingers 173, these lead wires 174 are attached to an electrical connector 175. This electrical connector is of any suitable conventional construction and is shown as being mounted exteriorly of body 10 on one side thereof and secured against a flat vertical surface 176 provided on this body by a series of attaching screws 178, four such screws being shown in FIG. 3.

In order to accommodate the lead wires 174 in their reach between electrical connector 175 and clamp fingers 173, body 10 is provided with a longitudinal horizontal recess 179 leading to body shoulder 23 and at its opposite end communicates with a lateral horizontal passage 180 formed as a recess in body face 176. Flange portion 72 of nozzle block assembly 69 has a hole 181 which registers with body passage 179. Lead wires 174 extend through hole 181 and passages 179 and 180, as shown in FIG. 17.

The mounting of electrical connector 175 on body 10 is accomplished in any suitable manner so that the base of this connector seals the outer end of wire passage 180 to prevent leakage of fluid from the interior of the servovalve.

The mode of connecting nozzle sump chamber 153 with return port 15 will now be described. Referring to FIGS. 13 and 16, body 10 is shown as provided with an elongated horizontal passage 182 which is a recess in the face 20 of this body. Passage 182 extends slightly below and laterally of but generally parallel to body bore 21. The passage 182 is shown as communicating intermediate its ends with a vertical passage 183 which leads upwardly from return port 15 and intercepts the passage 182. The open end of horizontal passaeg 182 is shown as covered by flange portion 72 of the nozzle plug assembly 69 but this flange portion has a restricted orifice 184 therein which establishes communication between sump chamber 153 and passage 182.

As shown in FIGS. 16 and 19, body groove 35 communicates with horizontal drain passage 182 via a crescent shaped channel 185 formed in the body 10.

Referring to FIGS. 16 and 23, body groove 39 communicates with horizontal drain passage 182 via another crescent shaped channel 186.

Means are provided for connecting body groove 24 with sump chamber 153. As shown in FIGS. 7, 14 and 18, body 10 is provided with another longitudinal horizontal drain passage 188 which is arranged directly above body bore 21 and extends generally parallel thereto. Passage 188 is formed as a recess in body face 20 and its open end is covered by flange portion 72 of nozzle block assembly 69 but this flange portion is shown as provided with a hole 189, preferably internally threaded for removal purposes as hereinafter explained, which registers with passage 188. The opposite or inner end of drain passage 188 communicates with body groove 24 via a crescent shaped channel 190 provided in body 10.

As shown in FIGS. 7 and 20, body groove 26 communicates with actuator port 16 via a vertical passage 191.

As shown in FIGS. 7 and 22, body groove 28 communicates with the other actuator port 17 via a vertical passage 192.

*Operation*

It is assumed that the servovalve is mounted so that pressure port 14 is connected to a suitable source of pressurized fluid, return port 15 is connected to the reservoir supplying the pump for producing the pressurized fluid or other drain and actuator ports 16 and 17 are connected to the hydraulic device such as a cylinder in which a piston is movable and whose position is to be controlled by the flow of fluid control of the servovalve of the present invention. Likewise, the electrical connector 175 is assumed to be connected to a suitable source of electrical command signal input.

From the internal structure of the servovalve, it will be seen that pressurized fluid is supplied to the internal chamber 94 of nozzle plug assembly 69 through the connected passages including port 14, passage 102, passage 100, through filter 103, channel 101, body groove 30, restricted inlet orifice 98, internal nozzle block chamber 94, damping orifice 92 and into spool end chamber 79. As well, such fluid can flow from the nozzle block chamber 94 through aperture 86 of nozzle member 83 into sump 153. From this sump chamber, fluid returns to drain port 15 through connected passages including restricted orifice 184, passages 182 and 183.

It will also be seen that pressurized fluid is supplied via grooves 27 and 37 to metering ports 41 and 42.

Any displacement of fluid occasioned by axial movement of valve spool 56 will flow from left spool end chamber 51 through connected passages including passage 44, body groove 24, channel 190, passage 188 and hole 189 into sump chamber 153 from which it can flow to return port 15 in the manner previously described.

Return flow metering ports 40 and 43 are serviced by bushing grooves 35 and 39, respectively, which in turn are serviced by body grooves 25 and 29, respectively. These grooves in turn are connected by channels 185 and 186 to return passage 182 which communicates with passage 183 leading to return port 15.

The purpose of restricted orifice 184 in the return flow system is to prevent surging of return fluid with respect to sump chamber 153.

Assuming valve spool 56 moves to the left as viewed in FIG. 7, this uncovers metering ports 40 and 42, thereby connecting actuating port 16 to return port 15 via connected passages including passage 191, grooves 36 and 26, holes 64, annular space 63, ports 40, grooves 35 and 25, channel 185 and passages 182 and 183, and connecting actuating port 17 to pressure port 14 via connected passages including passage 192, grooves 38 and 28, holes 66, annular space 65, ports 42, grooves 37 and 27 and passage 102.

Such leftward movement of valve spool 56 is achieved by the pressure in right spool end chamber 79 rising to a level such that the force exerted by such pressure against the right end face of spool lobe 60 exceeds the force exerted in the opposite direction by spring 68 in left spool end chamber 51. Movement of valve spool 56 will continue, for a constant pressure in right spool end chamber 79, until a force balance is achieved between spring 68 and the opposing force generated by fluid pressure in this chamber. Pressure in chamber 79 is controlled by the position of reaction member end face 145 relative to the tip of nozzle member 83. The closer the spacing the higher the back pressure in right spool end chamber 79, and the farther apart the end face 145 and the nozzle tip the lower such back pressure.

Assume now that the pressure in right spool end chamber 79 falls to a level where the force exerted by spring 68 predominates and moves the valve spool 56 to the right as viewed in FIG. 7. This uncovers metering ports 41 and 43, thereby connecting actuator port 16 to pressure port 14 via connected passages including passage 191, grooves 36 and 26, holes 64, annular space 63, ports 41, grooves 37 and 27 and passage 102, and connecting actuator port 17 to return port 15 via connected passages including passage 192, grooves 38 and 28, holes 66, annular space 65, ports 43, grooves 39 and 29, channel 186 and passages 182 and 183.

Movement of reaction member 112 is controlled by the passage of an electrical current through coil 113 carried by this member. When a current flows though coil 113 it reacts with the magnetic flux in gap 143 to produce an axially directed force to move the bobbin member 156 in one axial direction, and in the opposite axial direction when the current flows in the opposite direction. Thus, a command signal input as to polarity and magnitude, supplied by feed wires (not shown) connected to connector 175 and through lead wires 174 to coil 113, will control the direction of axial movement of reaction member 112 and the force applied thereto.

The flux flowing across magnetic gap 143 remains constant at all times. Hence there is no electrical hysteresis when the current flow through coil 113 is varied. The absence of electrical hysteresis is an outstanding advantage of the inventive servovalve.

Spring 168 has a very low spring rate and hence influences very little the movement of reaction member 112. It does serve to maintain the hub portion 158 of the bobbin member 156 against the opposing end face of pin collar 154 at all times.

If the command input signal causes the reaction member 112 to be driven leftward toward the nozzle member 83, pressure in right spool end chamber 79 increases. The fluid being discharged through nozzle aperture 86 impinges end face 145 of the reaction member and is deflected to flow laterally. Effectively an annular orifice of variable area is provided.

Inlet orifice 98 is fixed and produces a pressure drop and the pressure of fluid on the downstream side of this orifice 98 and which is in communication with right spool end chamber 79 is controlled by the size of the variable orifice just described formed by the nozzle tip and reaction member.

An important feature of the invention is that reaction member 112 can have wide excursions relative to the nozzle tip so that the servovalve has a high capability of overcoming malfunctions which might otherwise occur due to contaminants in the fluid plugging the clearance between the nozzle tip and reaction member. It will be appreciated that this clearance is very small. Also, the normal range of movement of the reaction member is very small a few thousandths of an inch.

Another important feature of the invention is the field serviceability of the servovalve. By removing cover screws 142, the cover 125 with the motor means 114 housed substantially completely therewithin, can be separated from the body 10. Lead wires 174 can be unsoldered where they join to connector 175, after screws 178 are removed, so as to permit these wires to be pulled through connected passages 180 and 179 and hole 181 in the nozzle block. Preferably this disconnection of the lead wires is done before motor cap screws 142 are removed. The retainer means 170–172 will limit expansion of spring 168 when bobbin rib 162 engages fingers 172.

After removal of cover 125 and motor means 114 counterbore 22 is exposed and in particular screws 74 which mount the nozzle block assembly 69 on body 10. By removing these screws 74 the assembly 69 can be separated from body 10. A male pull member (not shown) can be screwed into hole 189 to facilitate separation of nozzle block assembly 69 from body 10. This assembly 69 includes the nozzle block 70 having the various orifice members 83, 89 and 95 mounted thereon, and may therefore be cleaned by immersion in a solvent and its various restricted orifices blown clean by compressed air.

The filter assembly 103 may be removed for cleaning if desired. This is accomplished by removing end cap screws 49, removing adjustor end cap 46 and filter retainer 108 and then the filter assembly.

When end cap 46 is off body 10 bushing member 31 can be withdrawn from body bore 21, and also valve spool 56 can be removed from the bushing, so that these members too can be cleaned. As well the various passages in the body can be cleaned.

Even the motor means can be readily disassembled for cleaning if this is desired. The pole pieces 115 and 116 can be pulled out of engagement with permanent magnet ring 117. Pin 144 can be withdrawn from guideway 146 and bobbin member 156 can be slipped off this pin.

After all parts are cleaned they are assembled by reversing the procedure described hereinabove.

While the body is shown as bored to receive a bushing in turn bored to receive the valve spool, a modified construction could omit the bushing. Also, instead of a cylindrical bore slideably receiving a cylindrical valve spool, any shape of valve slide could be movably arranged in a slideway suitably formed to receive it.

From the foregoing, it will be seen that the present invention provides a servovalve in which means are arranged to apply to a valve slide movably arranged in a slideway oppositely directed position determining forces one of which may predominate over the other in response to an electrical command signal fed to the movable coil of an electromagnetic force motor means to position a reaction member with respect to a nozzle which is discharging fluid against it, the pressure of fluid between the nozzle and an upstream fixed orifice being applied to one end of the valve slide.

Since variations or changes in construction may occur to those skilled in the art without departing from the spirit of the present invention the embodiment shown and described is illustrative and not limitative of the invention which is to be measured by the scope of the appended claims.

What is claimed is:

1. A servovalve including a body having a slideway, a valve slide movably arranged in said slideway leaving end chambers at opposite ends of said slide, means arranged to apply to said slide oppositely directed position determining forces one of which may predominate over the other in response to an electrical command signal, said means comprising electromagnetic force motor means including a movable signal input coil, fluid discharge means including a nozzle and a fixed upstream orifice, a reaction member movable with said coil and impinged by fluid discharged by said nozzle, means for applying through a restricted damping orifice the pressure of fluid between said nozzle and upstream orifice to one of said end chambers and thereby to one end of said slide, means providing a fluid sump chamber into which said nozzle discharges and including a restricted drain orifice, and means connecting the other of said end chambers to said sump chamber upstream of said drain orifice.

2. A servovalve according to claim 1, wherein spring means constantly urges said reaction member to move toward said nozzle.

3. A servovalve according to claim 2, wherein said motor means further includes an inner pole piece having an external cylindrical surface at one end, a first axially facing shoulder at the inner end of said external surface and an annular flange at the opposite end of said inner pole piece, an outer pole piece having first and second internal cylindrical surfaces surrounding said external surface severally in spaced relation thereto and also has a shoulder at one end of said second internal surface and facing axially in a direction opposite from said first shoulder, and a spacer ring engages said shoulders and also said external and second internal surfaces.

4. A servovalve according to claim 3, wherein a pin supports the reaction member and is guidingly mounted on the inner pole piece for movement relative to the nozzle.

5. A servovalve according to claim 4, wherein the reaction member includes a bobbin portion movably arranged in the gap between the pole pieces, and the signal input coil is wound on said bobbin portion, the inner pole piece has a recess, an insert is secured in said recess and has a guideway, the pin is slidably arranged in said guideway, one end of said pin opposing the nozzle to provide therewith an orifice of variable area, a shoulder is formed on said pin and faces axially in a direction away from said nozzle, the bobbin portion on said pin engages said shoulder, and the spring means surrounds said pin at one end engaging said member and at its opposite end engaging said insert.

6. A servovalve according to claim 5, wherein a retainer for said bobbin portion is mounted on the outer pole piece and includes a ring portion having an opening of larger diameter than that of said bobbin portion with said coil thereon and also includes a plurality of radially inwardly projecting, axially offset and circumferentially spaced finger portions which overlap said bobbin portion.

7. A servovalve according to claim 6, wherein the retainer further includes clamp fingers holding lead wires of the input coil against the outer pole piece, and means secure said retainer to said outer pole piece.

8. A servovalve according to claim 7, wherein the outer pole piece is ring-shaped, the inner pole piece is post-shaped and has a small end and a large end, said outer pole piece surrounds said small end in spaced relation thereto to provide the annular gap therebetween, said large end is remote from said outer pole piece, the permanent magnet means includes a permanent magnet ring arranged between and engaging said outer pole piece and said large end, a cover is removably secured to said body and substantially houses said pole pieces and permanent magnet ring, a seat is formed on said body for and engaged by said outer pole piece, and third spring means is arranged between said cover and inner pole piece.

9. A servovalve according to claim 1, wherein a nozzle block closes said slideway to provide the one end chamber at the end of the slide and also includes an internal chamber, first restricted orifice means on said block establishes communication between said chambers and provides the damping orifice, second restricted orifice means on said block provides said upstream orifice which communicates with said internal chamber, means supply pressurized fluid to said internal chamber through said second restricted orifice means, the nozzle is on said block and communicates with said internal chamber, means removably secures said block to said body, and means including the reaction member control the flow of fluid from said nozzle in response to a command input.

10. A servovalve according to claim 9, wherein the nozzle block has an annular flange portion engaging a shoulder on the body, and the securing means attaches said flange portion to said body.

11. A servovalve according to claim 9, wherein the nozzle block has a through-bore communicating with the end chamber and a lateral bore, that end portion of said through-bore remote from said end chamber being smaller in transverse dimension than the opposite end portion, the nozzle is press-fitted into said remote end portion through said opposite end portion, a damping orifice member is press-fitted into said opposite end portion, and an inlet orifice member is press-fitted into said lateral bore.

12. A servovalve according to claim 10, wherein a cover is provided for the control means to be removably secured to the body and jointly with an enlarged recess formed at one end of the slideway provides the sump chamber into which the nozzle discharges fluid, a restricted hole is provided in the flange portion for communicating with said sump chamber to provide the drain orifice, and drain passage means in said body communicates with said hole.

13. A servovalve according to claim 12, wherein the other end chamber is provided at the opposite end of the slide, and passage means in said body and flange portion establishes the communication between said other end chamber and sump chamber.

14. A servovalve according to claim 13, wherein a spool bushing is provided in a first bore in the body and includes a second bore and metering ports establishing communication between said second bore and branch passages for connecting to the drain passages, and a valve spool is slidably arranged in said second bore and has end lobes operatively associated severally with said metering ports.

15. A servovalve according to claim 14, wherein the first bore includes first and second annular grooves, a filter chamber is provided, a main fluid supply passage communicates with both said second groove and filter chamber, a secondary fluid supply passage communicating with said first groove and with said filter chamber, filter means is arranged in said filter chamber, said main passage communicates with said filter chamber on the upstream side of said filter means, said secondary passage communicates with said filter chamber on the downstream side of said filter means, and a valve bushing is arranged in said bore and has a pressure metering port communicating with said second groove, and the valve spool has an intermediate lobe operatively associated with said pressure metering port.

16. A servovalve according to claim 9, wherein a body has a bore and a counterbore providing a shoulder therebetween and also has a passage with one end terminating in said shoulder and with its other end terminating in one side of said body, an electrical connector is mounted on said body to cover said other end of said passage and the valve slide is a spool slidably arranged in said bore.

17. A servovalve according to claim 16, wherein the ends of the coil terminate in terminals carried by the reaction member, and the lead wires at one end are connected to said terminals and at the other end are connected to the connector.

References Cited

UNITED STATES PATENTS

| | | | |
|---|---|---|---|
| 2,625,136 | 1/1953 | Moog | 137—625.61 |
| 2,750,961 | 6/1956 | Uritis | 251—129 XR |
| 2,934,765 | 4/1960 | Carson | 137—625.61 |
| 2,973,746 | 3/1961 | Jupa | 137—625.63 |
| 2,993,961 | 7/1961 | Blake | 179—115.5 |

HENRY T. KLINKSIEK, *Primary Examiner.*